(12) United States Patent
Crockett

(10) Patent No.: US 6,202,821 B1
(45) Date of Patent: Mar. 20, 2001

(54) GRAVITY MOTIVATED FLOW-RAIL

(76) Inventor: Richard E. Crockett, 9595 Jeters Chapel Rd., Vinton, VA (US) 24179

( * ) Notice: Subject to any disclaimer, the term of this patent is extended or adjusted under 35 U.S.C. 154(b) by 0 days.

(21) Appl. No.: 09/212,712

(22) Filed: Dec. 16, 1998

(51) Int. Cl.[7] ............................................. B65G 13/00
(52) U.S. Cl. .................. 193/35 G; 193/35 A; 193/38; 193/39; 193/40; 198/530
(58) Field of Search ........................ 198/459.6, 460.1, 198/608, 530; 193/38, 39, 40, 35 G, 35 A

(56) References Cited

U.S. PATENT DOCUMENTS

| | | | |
|---|---|---|---|
| Re. 34,924 | 5/1995 | Highsmith | 193/35 R |
| 1,425,599 | * 8/1922 | Lister | 193/35 A |
| 1,483,971 | * 2/1924 | Grossman | 193/35 G |
| 2,315,659 | * 4/1943 | Russell | 193/35 A |
| 2,441,469 | * 5/1948 | Cameron | 193/35 A |
| 2,865,484 | * 12/1958 | Biddison | 193/39 |
| 2,983,392 | * 5/1961 | Ebbert | 193/35 A |
| 3,017,007 | * 1/1962 | McGrath | 193/40 |
| 3,058,564 | * 10/1962 | Kubat | 193/35 |
| 3,081,863 | * 3/1963 | Monohan | 198/34 |
| 3,182,785 | * 5/1965 | Tourtellotte | 198/127 |
| 3,265,186 | * 8/1966 | Burton | 193/35 A |
| 3,399,752 | * 9/1968 | Orwin | 193/35 |
| 3,930,995 | 1/1976 | Paddock et al. | 209/74 |
| 4,050,561 | 9/1977 | Seitz | 193/35 R |
| 4,253,558 | * 3/1981 | Roeing et al. | 193/35 A |
| 4,258,850 | 3/1981 | Solaroli | 209/655 |
| 4,379,503 | 4/1983 | Kornylak | 193/37 |
| 4,541,518 | 9/1985 | Palazzolo et al. | 193/35 A |
| 4,645,056 | 2/1987 | Palazzolo et al. | 193/35 A |
| 4,765,493 | 8/1988 | Kinney | 211/59.2 |
| 5,213,189 | * 5/1993 | Agnoff | 193/35 A |
| 5,350,048 | 9/1994 | Wylie | 193/35 A |
| 5,474,412 | 12/1995 | Pfeiffer et al. | 414/276 |
| 5,490,587 | * 2/1996 | Fisher | 193/35 A |
| 5,655,667 | * 8/1997 | Isaacs | 198/460.1 |
| 5,664,657 | 9/1997 | Neukam | 193/35 R |

OTHER PUBLICATIONS

"Tygard Machine & Manufacturing Co. Introduces the Tygard Claw", a brochure by Tygard Machine and Manufacturing Co., 300 Meadowlands Boulevard, Washington, Pennsylvania 15301.

"Interroll", a brochure by Interroll Corporation, 3000 Corporate Drive, Wilmington, NC 28405.

"Mallard Flo–Guide Conveyors Material Handling and Storage Equipment", Form No. 990, Mallard Manufacturing Corporation, 101 Mallard Road, Sterling, Illinois 61081.

* cited by examiner

Primary Examiner—Douglas Hess
(74) Attorney, Agent, or Firm—Luedeka, Neely & Graham, P.C.

(57) ABSTRACT

A gravity flow rail conveyor and picking system comprises a plurality of conveyor rail lanes having module or pallet support surfaces that rise at a suitable gravity flow angle from a selectively erected abutment chock. When erected, the chock abutment prevents gravity flow of modules along the support surface below the chock. When retracted, at least one module is allowed to flow by gravity onto a level support surface suitable for interfacing with an automatic picking machine. As the picking module flows onto a respective level surface, the chock rotates to an erect position for preventing additional modules from passing the abutment point.

5 Claims, 4 Drawing Sheets

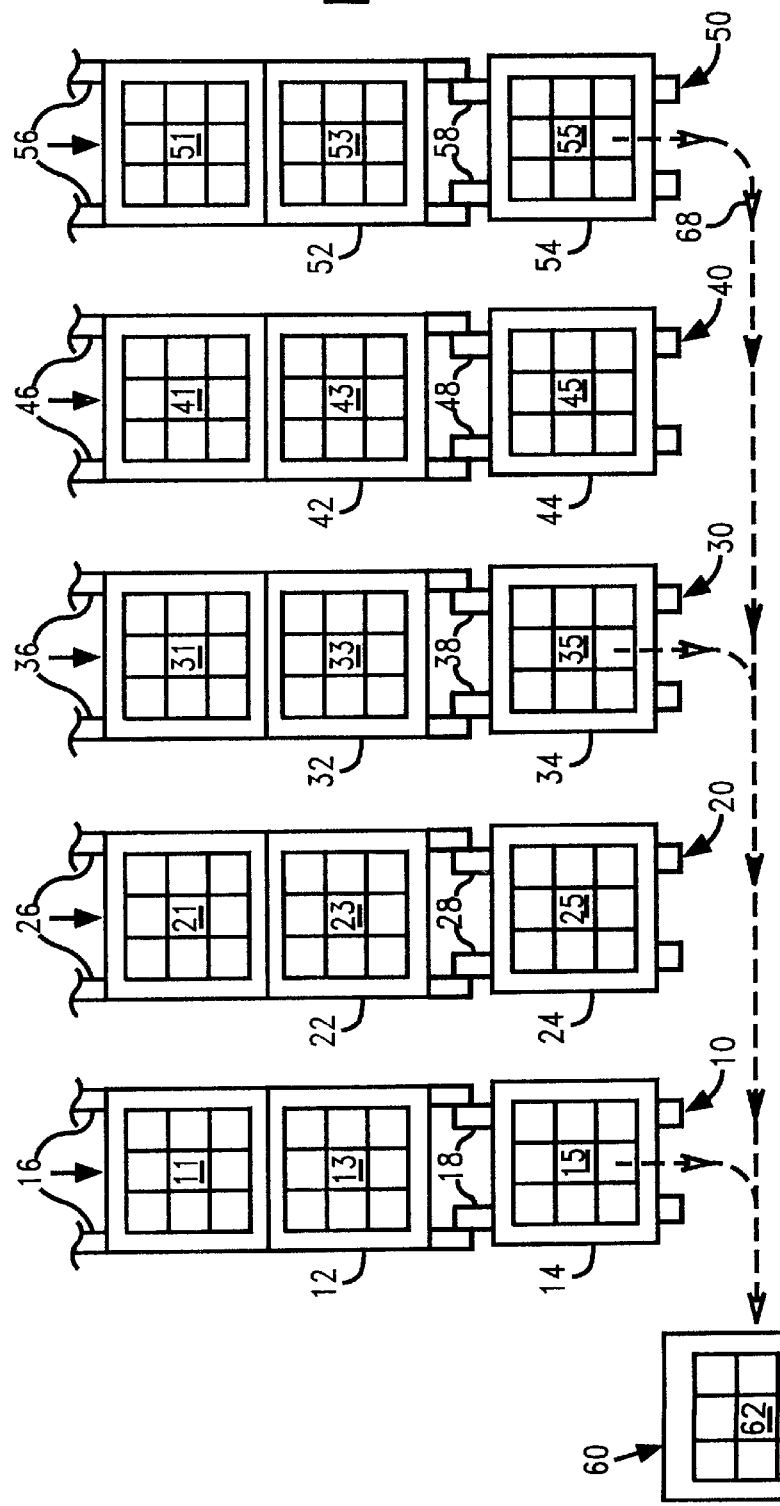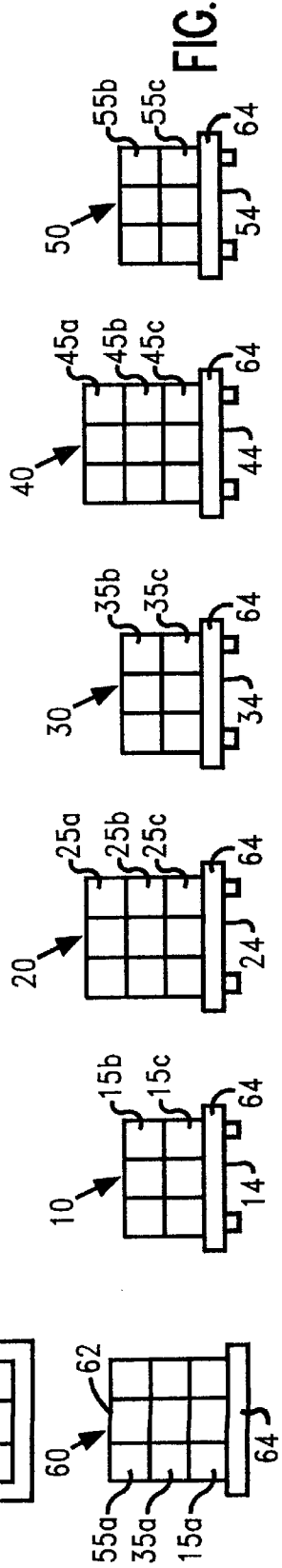

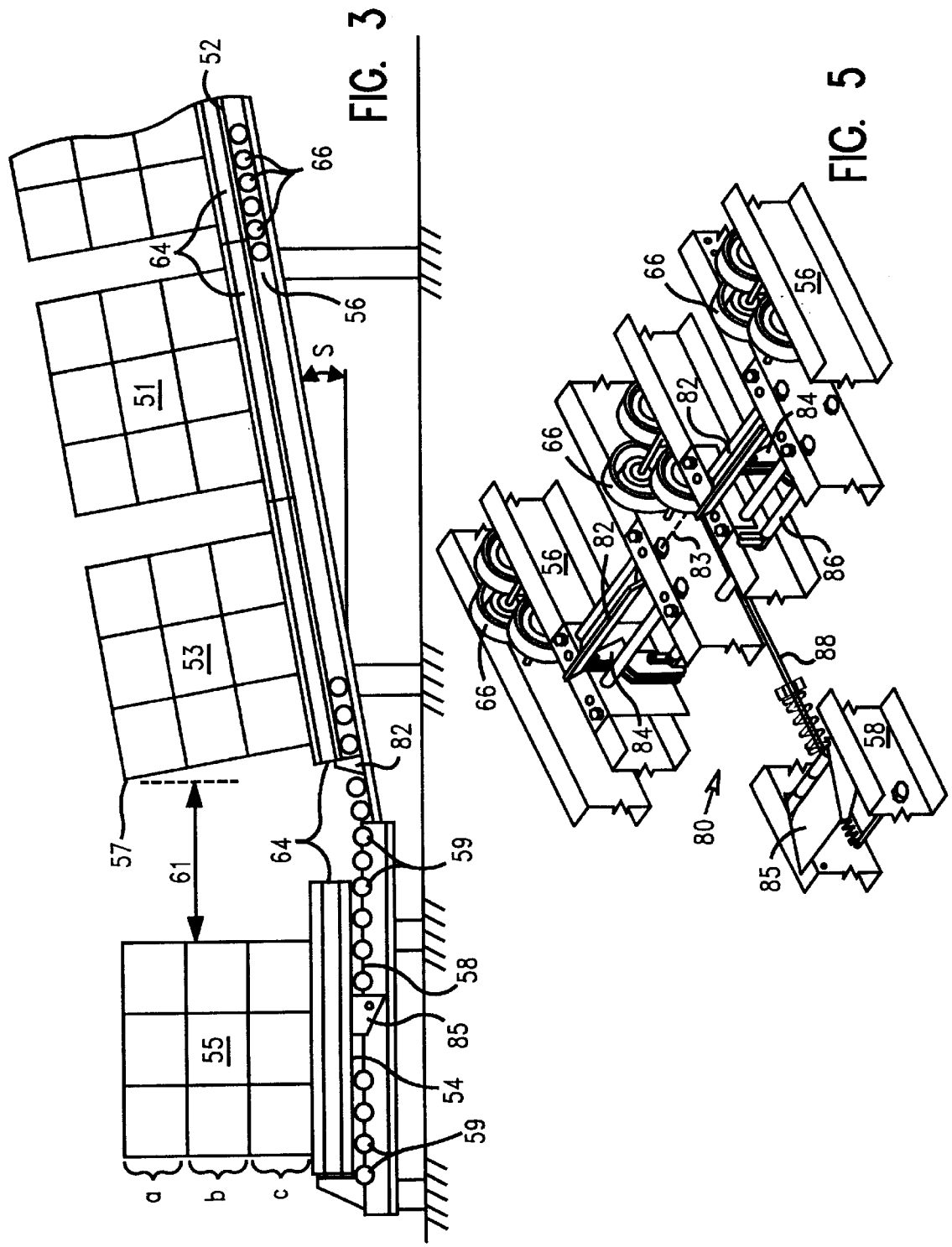

GRAVITY MOTIVATED FLOW-RAIL

BACKGROUND OF THE INVENTION

This invention relates to gravity conveyors. More particularly, the invention relates to order picking and assembly lines that are supplied and supported by gravity flow lanes.

Many trade articles are unitized into standardized modules for market transport and delivery. A module may constitute a compactly aligned and stacked assembly of numerous smaller units on a portable platform called a pallet. Furthermore, competitors within a single industry, such as for bottled beverages, will cooperate to standardize the size and shape of their product market packages to facilitate filling and handling by automatic machinery.

Warehouse storage of articles on pallets or modular containers is further facilitated by low friction pallet support platforms. These low friction platforms are often a multiplicity of parallel planar lanes set along a shallow slope such as 0.4 to about 0.5 in./ft. Each lane width is usually sufficient for only one line of modules or pallets. The low friction surface is usually provided by a multiplicity of small wheels or rollers supported on anti-friction on bearings for rotation about parallel axes. Conceivably, however, other forms of low friction surface may be used such as air-bearing tables.

The functional objective of these sloped, low-friction pallet lanes is to exploit gravity for movement of the warehouse stock. For an inventory management that desires the "first in first out" principle, newly arrived inventory is placed on a sloped pallet lane at the upper end and inventory to be removed is withdrawn from the low end of the lane. A queue of modules or pallets, terms hereafter used interchangeably and synonymously, advance by gravity alone from the high end to the low end of a lane without external power.

Such low friction surface lanes have come to be known and characterized in the art as "gravity conveyors", "flow rails" and numerous similar terms and phrases.

Controls over such flow rails are usually limited and simple in principle. For example, velocity of a module along a flow rail is often restrained by conveyor surface support rollers having centrifugal drag braking. Manually or automatically engaged chocks may be used to prevent downward movement of modules past a predetermined point until desired.

In a separate but related practice, product distribution warehouses may draw from a multiplicity of individual product storage lanes to assemble a specified order. This order assembly process and practice is often characterized in the art by the term "picking". A specified order is assembled by picking and choosing from among many available offerings. These offerings may be presented for picking convenience by gravity flow rails. For example, each of products A, B and C may be packaged in standardized units whereby four units may be aligned in a single tier plane above a pallet surface. Additionally, four tier planes of these units may be stacked vertically above the pallet surface for a full module comprising sixteen units of the product.

Representatively, an order may specify four units of product A, four units of product B and eight units of product C. Assembly of the order will therefore draw one pallet tier from the product A supply lane, one pallet tier from the product B supply lane and two pallet tiers from the product C supply lane. These four tiers are vertically assembled on a single order pallet for delivery to the buyer.

To expedite the picking process, powered grapples called "pickers" that are carried by overhead lifts or warehouse trucks have been devised to grasp, lift and transport one or all of the product tiers on a pallet, simultaneously. Implements such as the Tygard Claw® manufactured by the Tygard Machine and Manufacturing Co. of Washington, Pa. are representative. However, the reliable operation of such implements is predicated on a level planar alignment of the tiers. Since the alignment of several product units, within a tier includes no structural connection therebetween, only continuous surface friction between the units of a tier holds the tier together under the compressive grip of the grapple implement. A planar misalignment of a pallet tier with the picker grapples by the magnitude of a gravity flow slope exceeds the capacity of the implement. Hence, use of a picker to assemble specified orders from a gravity flow rail has required that the actively picked pallet in a product flow rail be removed from the flow rail lane and placed on a level surface that is accessible to the picker.

Traditionally, this removal and repositionment of a picked pallet to a level surface has required selectively applied power, such as a powered conveyor or a manually operated warehouse truck.

It is, therefore, an object of the present invention to provide gravity motivated transition of a flow rail module onto a level surface.

Another object of the invention is a picking system having a substantially self-regulating transfer of modules from a gravity flow rail to a level surface.

SUMMARY OF THE INVENTION

These and other objects of the invention are met with a gravity flow unit conveyor system for unitized package modules having a horizontal delivery or picking station.

In the usual application and preferred embodiment of the invention, a plurality of gravity flow lanes are constructed to rise along a slope plane at a preferred rate of about 0.4 to 0.5 inches per foot. These gravity flow means are low friction surfaces that are usually constructed with a multiplicity of wheels or rollers supported by anti-friction bearings. A warehouse may have hundreds of such gravity flow lanes in side-by-side and/or vertically aligned parallelism.

Articles stored in the warehouse may, for standardized handling and convenience, be containerized in hard-bottom modules or stacked on pallets. Such modules or pallets are queued serially along a gravity flow lane so as to slide in a line under the force of gravity toward the lower end of the lane. As a module is removed from the lower end of the lane the entire line advances.

At the lower end of each gravity flow lane is a level transition station where the lowermost module slides onto a level platform for subsequent handling or grappling by a picking machine. As the lowermost module moves onto the level surface, the module weight or presence thereon operates a retractable abutment that engages the module next in line on the gravity flow rail. This retractable abutment blocks further movement of the line until the module on the level station is removed.

A picking machine that requires a square and level article for proper grappling may act upon the level module without manual repositionment. Applied to customized order assembly, diverse products stored in respective flow lanes may be picked by need of a composite order with respective product contributions, assembled at an accumulation station until all elements are added.

BRIEF DESCRIPTION OF THE DRAWINGS

The invention is described in detail by reference to the accompanying drawings wherein like reference characters designate like or similar elements throughout the several figures of the drawings and wherein:

FIG. 1 is a schematic flow plan for a picking system according to the invention;

FIG. 2 is a schematic flow elevation for a picking system according to the invention;

FIG. 3 is a side elevation view of a preferred embodiment of the invention;

FIG. 5 is an isometric detail of a selective abutment mechanism; and,

DESCRIPTION OF THE PREFERRED EMBODIMENT

Figure 4:
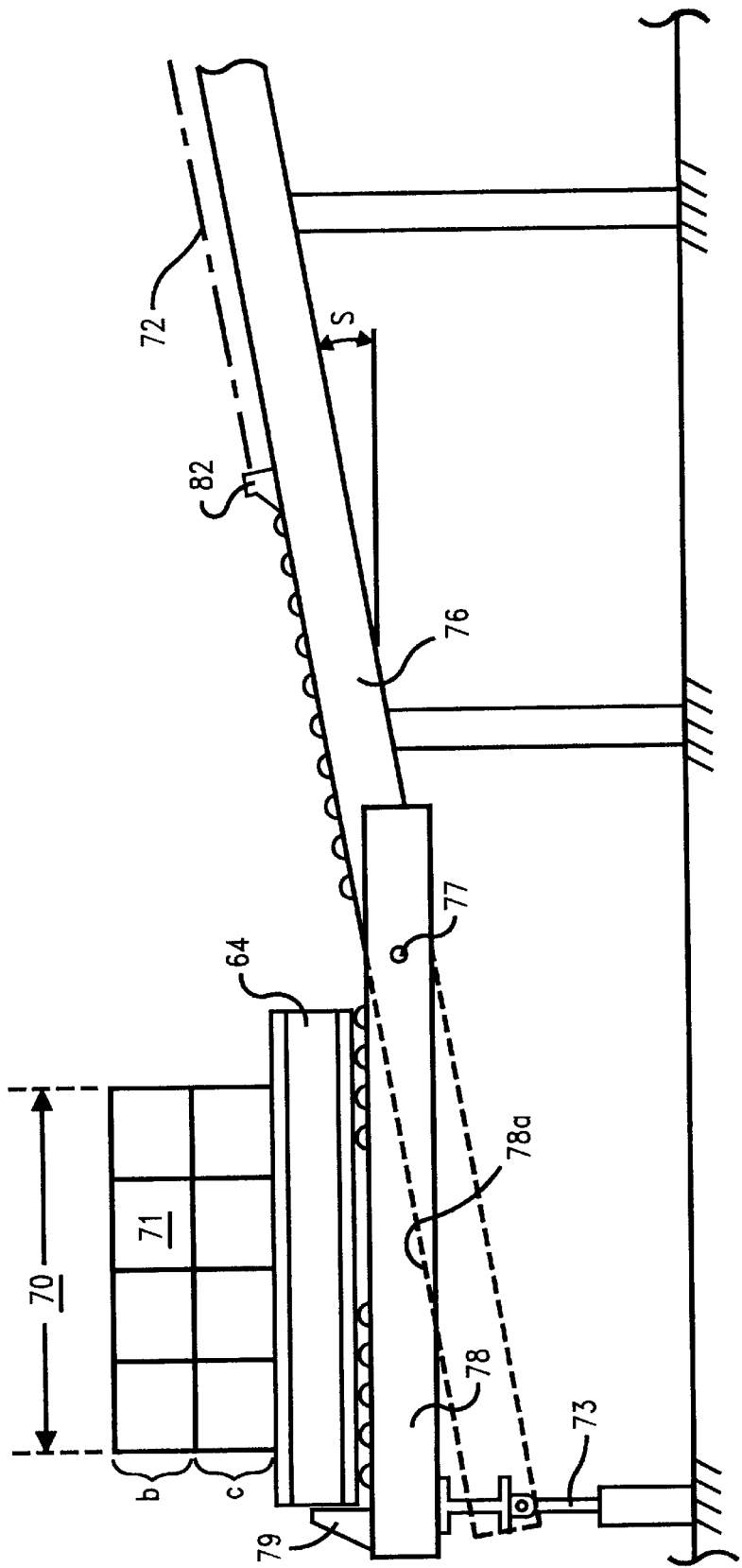
FIG. 4 is a side elevation of an alternative embodiment of the invention.

With respect to the FIGS. 1 and 2, a representative gravity flow rail warehouse system is shown to include five gravity flow lanes 10, 20, 30, 40 and 50. Flow lane 10 is structurally defined by a pair of roller rails 16 such as is illustrated more pictorially by the roller rails 56 of FIG. 5. These roller rails 16 provide a low friction support surface sloped along a gravity flow plane 12 for a plurality of article modules 11 and 13. Slope for a gravity flow plane 12 is variable depending on the nature of the low friction surface and the cooperative module bottom surface. Roller flow rails supporting load pallets with wood skids may use a slope of about 0.4 to about 0.5 in. per ft. Other flow plane surfaces and load containment modules may require more or less slope.

Flow lane 20 is defined by roller rails 26 disposed along gravity flow plane 22 for support of article modules 21 and 23. Flow lane 30 is defined by roller rails 36 disposed along gravity flow plane 32 for support of article modules 31 and 33. Flow lane 40 is defined by roller rails 46 disposed along gravity flow plane 42 for support of article modules 41 and 43. Flow lane 50 is defined by roller rails 56 disposed along gravity flow plane 52 for support of article modules 51 and 53.

Each of these flow lanes is terminated by a horizontal picking station 14, 24, 34, 44 and 54. Roller rails 18, 28, 38, 48 and 58 provide a horizontal picking surface for the respective picking modules 15, 25, 35, 45 and 55. Representatively, each picking module comprises three tiers, a, b and c. Respectively, each tier comprises nine loosely aligned article units.

A picking assembly station 60 provides a pallet 64 onto which three tiers of product units are assembled. For the present example, tiers 15a, 35a and 55a have been removed from picking modules 15, 35 and 55, respectively, and stacked at the assembly station 60 on pallet 64 for development of a specified module 62.

Figure 6:
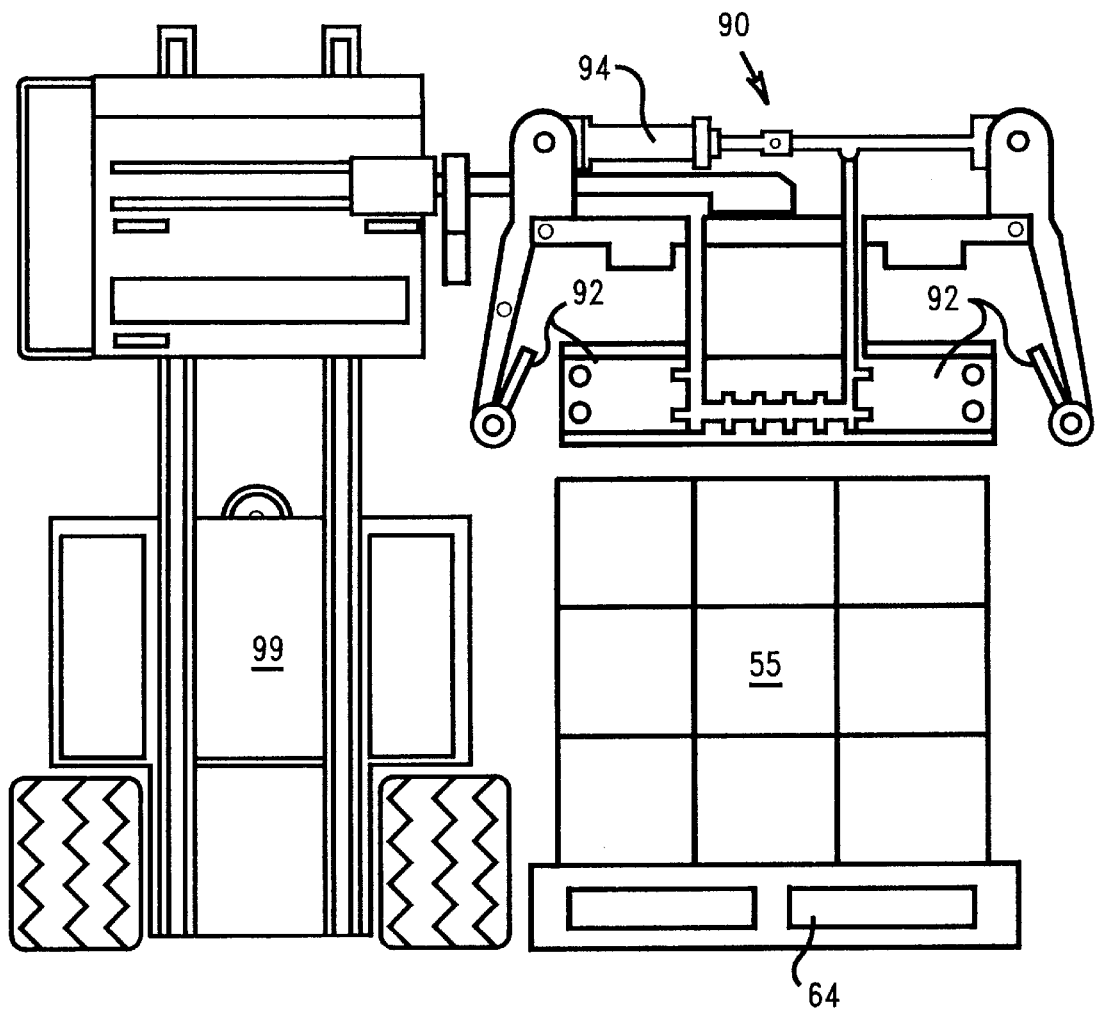
FIG. 6 is a schematic elevation of a powered grapple.

The picking movement for product unit tiers 15a, 35a and 55a onto assembly station pallet 64 is represented by the flow arrows 68. This picking movement is carried out by a picking grapple 90 such as shown by FIG. 6. The picker 90 may be supported by an overhead lift or a warehouse truck 99. Operatively, the picker 90 grapple plates are manipulated over a picking station module 55, for example. The grapple plates 92 are thereafter lowered over the picking module 55 to the desired tier level. The grapple plates 92 are then closed by hydraulic struts 94, for example to compress the nine product units of a tier together. The tier or tiers selected are lifted and transferred to the assembly station 60.

Referring to the FIG. 3 elevational schematic, the flow lane 50 is shown in greater detail. The gravity flow plane 52 is structurally determined as a common plane of tangency to the conveyor rollers 66. The roller 66 axes are supported by structural channels or beams 56 set at a strategic slope to the horizontal. A slope of about 0.4 to about 0.5 in. rise per ft. of horizontal length or run is typical for such applications.

At the lower end of the flow lane 50, the flow plane 52 intersects with the horizontal picking plane 54 defined by the tangents of rollers 59. The roller 59 axes are supported structurally by beams 58.

At a convenient point about the intersection of planes 52 and 54, retractable chock plates 82 are operatively secured to the channels 56 to oscillate about an axis 83. These chock plates are selectively erected to bear against the pallet 64 of lower most module 53 in the serial continuity of modules along the flow plane 52 for preventing movement of module 53 and those above it past the chock 82. To be noted from the side elevation of FIG. 3 is that due to the slopes, the upper loading edge 57 of the lowermost module 53 may be in a more advanced vertical plane than the edge of supporting pallet 64. The chocks 82 hold this upper leading edge away from the operational space 61 necessary for penetration of the picker grapple plates 92. The chock plate mechanism 80 of FIG. 5 includes a sensor plate 85 that is pivotally secured to the picking station level rails 58. A spring biased crank rod 88 is pivotally connected by wrist pins to each of the sensor plate 85 and a crank shaft 86. Toggle links 84 at opposite ends of the crank shaft 86 are pivotally connected to the chock plates 82.

Operatively, the weight and presence of a pallet 64 on the horizontal picking plane 54 rotates the sensor plate 85 to the horizontal position against the bias of counter-rotating erecting springs. Such rotation of the sensor plate 85 strokes the crank rod 88 to rotate the crank shaft 86. By the toggle links 84, the chock plates 82 are rotated to a module abutment position.

It will be understood by those of ordinary skill that the chocks 82 may be raised and lowered by numerous other mechanisms and devices such as motors that are controlled by contact switches, proximity switches or photoelectric eyes.

When the picking module pallet 64 is emptied of product, the pallet is removed from the level picking plane 54 to release the sensor plate 85. Bias of the preloaded springs rotationally raises the sensor plate and rotationally lowers the chock plates 82 thereby releasing the module 53 to gravity movement along the remaining increment of the gravity flow plane 52. The inertia of such movement carries the module onto the level picking plane 54. Strategic placement of the sensor plate 85 causes the oncoming module 53 to engage and depress the sensor plate 85 thereby erecting the chock plate 82 to prevent advancement of the next module 51 past the chock plate 82 position.

An alternative embodiment of the invention is shown by FIG. 4. Gravity flow rails 75 support the flow plane 72 onto a picking station 70 section of flow rails 78 that pivots about an axis 77. A fluid strut or motor 73 lifts the distal end of rails 78 about the axis 77 from a lower position 78a to an upper, horizontally level position during the presence of a pallet 64.

When the picking station 70 is absent a picking module 71, the support strut 73 lowers the rails 78 about the axis 77 to the 78a alignment position and retracts the chock plate 82. When the chock plate 82 is retracted, the next pallet 64 rolls or slides by gravity onto the picking station 70 until stopped by a fixed abutment 79. In transit between the retracted chock plate 82 and the fixed abutment 79, a strategically positioned sensor plate or switch operates the chock plate 82 to the flow blocking position and energizes the strut 73 to raise the rails 78 to the level alignment position.

The foregoing descriptions of preferred embodiments of my invention have been presented for purposes of illustration and explanation. Disclosure of these embodiments is not intended to be exhaustive or to limit the invention to the precise forms disclosed. Obvious modifications or variations are possible in light of the above teachings. These embodiments were chosen and described to provide the best illustrations of the principles of the invention and its practical applications. Further, these preferred embodiments were selected to enable one of ordinary skill in the art to utilize the invention in various forms and with various modifications as is suited to a particular utility. All such modifications and variations are within the scope of the invention as determined by the appended claims when interpreted in accordance with the breadth to which they are fairly, legally and equitable entitled.

As my invention, therefore,

I claim:

1. A gravity flow rail conveyor comprising:

a first non-driven support surface for a plurality of serially aligned modules, said support surface extending from a lower end in a first direction from a selectively engaged abutment at a flow angle from horizontal sufficient for gravity induced movement of said modules along said support surface toward said abutment, sad first support surface including substantial parallel first and second roller rails separated by a first distance;

a second non-driven support surface for at least one of said modules having a receiving end extending from said abutment in a second direction substantially opposite from said first direction along a substantially horizontal plane which prevents gravity induced movement of said modules, said second support surface including first and second roller rails substantially parallel to the first and second roller rails of said first non-driven support surface and separated by a second distance different than said first distance;

wherein the lower end of the first non-driven support surface overlaps the receiving end of the second non-driven support surface so that the first and second non-driven support surfaces intersect; and means for engaging said abutment against a module on said first support surface to prevent gravity induced movement of modules on said first support surface above said abutment when at least one module in the serial alignment has moved by gravitational force from said first support surface onto said second support surface.

2. A conveyor as described by claim 1 further comprising means for disengaging said abutment from a module on said first support surface when said module on said second support surface is removed therefrom.

3. A conveyor as described by claim 1 wherein said second support surface is selectively moved from a first position to a second position, said first position being along said substantially horizontal plane and said second position being along the flow angle of said first support surface.

4. A conveyor as described by claim 3 comprising power means to move said second support surface from said second position to said first position.

5. A modular picking system comprising:

a plurality of gravity conveyors having a first support surface with a lower end extending from respective abutment means along a rising slope for supporting a series plurality of modular articles, said abutment means having selective engagement with an article on a respective first support surface to prevent gravity induced movement of such article along the respective first support surface, each first support surface including substantial parallel first and second roller rails separated by a first distance;

a plurality of substantially level second support surfaces with a receiving end extending from each abutment means in a direction substantially opposite from a respective first support surface, each second support surface including first and second roller rails substantially parallel to the first and second roller rails of said first support surface and separated by a second distance different than said first distance;

wherein the lower end of each first support surface overlaps the receiving end of a respective second support surface so that the first and second support surfaces intersect;

depositing modular articles on said first support surfaces above said abutments for gravity induced movement in a serial alignment toward said abutment means;

means for selectively disengaging said abutment means from a first article on a respective first support surface to permit gravity induced movement of said first article onto said second support surface; and picking means for removing at least a portion of said first article on a first of said second support surfaces and depositing said portion at an accumulation position, said picking means subsequently removing at least a portion of a first article on a second of said second support surfaces for deposit at said accumulation position.

\* \* \* \* \*